(12) United States Patent
Tuneld et al.

(10) Patent No.: US 11,403,867 B2
(45) Date of Patent: Aug. 2, 2022

(54) METHOD OF CONTROLLING AN ELECTRONIC DEVICE

(71) Applicant: FINGERPRINT CARDS AB, Gothenburg (SE)

(72) Inventors: Mats Tuneld, Lund (SE); Olis Olofsson, Malmö (SE); Bengt Lindoff, Bjärred (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 16/757,951

(22) PCT Filed: Oct. 24, 2018

(86) PCT No.: PCT/SE2018/051086
§ 371 (c)(1),
(2) Date: Apr. 21, 2020

(87) PCT Pub. No.: WO2019/088897
PCT Pub. Date: May 9, 2019

(65) Prior Publication Data
US 2020/0265203 A1 Aug. 20, 2020

(30) Foreign Application Priority Data
Oct. 31, 2017 (SE) .................... 1751355-7

(51) Int. Cl.
*G06V 40/13* (2022.01)
*G06F 3/041* (2006.01)
(Continued)

(52) U.S. Cl.
CPC ........ *G06V 40/1306* (2022.01); *G06F 3/0412* (2013.01); *G06F 3/0488* (2013.01); *G06F 3/04146* (2019.05); *G06F 21/32* (2013.01); *G06V 40/67* (2022.01)

(58) Field of Classification Search
CPC ............. G06K 9/0002; G06K 9/00912; G06K 9/00006; G06F 3/04146; G06F 3/0412;
(Continued)

(56) References Cited

U.S. PATENT DOCUMENTS

2014/0354556 A1   12/2014   Alameh et al.
2015/0220767 A1   8/2015    Yoon et al.
(Continued)

FOREIGN PATENT DOCUMENTS

CN    106778150 A    5/2017
EP    3054399 A1     8/2016
(Continued)

OTHER PUBLICATIONS

PCT International Search Report and Written Opinion dated Jan. 10, 2019 for International Application No. PCT/SE2018/051086, 13 pages.
(Continued)

*Primary Examiner* — Abhishek Sarma
(74) *Attorney, Agent, or Firm* — RMCK Law Group, PLC (57) ABSTRACT

The present disclosure relates to a method of controlling an electronic device, the electronic device comprising a fingerprint sensor. The present disclosure also relates to a corresponding electronic device and to a computer program product.

19 Claims, 4 Drawing Sheets

(51) Int. Cl.
*G06F 3/0488* (2022.01)
*G06F 21/32* (2013.01)
*G06V 40/60* (2022.01)

(58) Field of Classification Search
CPC .... G06F 3/0488; G06F 21/32; G06F 3/04886; G06F 3/04883; G06F 3/0486; G06F 3/041; G06F 3/048; H04M 2250/22; H04M 1/67; G06V 40/1306; G06V 40/67; G06V 40/12
See application file for complete search history.

(56) References Cited

U.S. PATENT DOCUMENTS

| | | | |
|---|---|---|---|
| 2016/0092018 | A1 | 3/2016 | Lee et al. |
| 2016/0246396 | A1 | 8/2016 | Dickinson et al. |
| 2016/0364591 | A1 | 12/2016 | El-Khoury et al. |
| 2017/0053151 | A1 | 2/2017 | Yazandoost et al. |
| 2017/0308732 | A1* | 10/2017 | Wang .................... G06F 3/0488 |
| 2018/0012057 | A1* | 1/2018 | Cho .................... G06K 9/00087 |

FOREIGN PATENT DOCUMENTS

| | | |
|---|---|---|
| EP | 3066614 A1 | 9/2016 |
| EP | 3182314 A1 | 6/2017 |
| EP | 3319303 A1 | 5/2018 |
| WO | 2015066330 A1 | 5/2015 |
| WO | 2017003018 A1 | 1/2017 |

OTHER PUBLICATIONS

Extended European Search Report dated Nov. 4, 2020 for European Patent Application No. 18873472.7, 8 pages.

* cited by examiner

METHOD OF CONTROLLING AN ELECTRONIC DEVICE

CROSS-REFERENCE TO RELATED APPLICATIONS

This application is a 371 U.S. National Stage of International Application No. PCT/SE2018/051086, filed Oct. 24, 2018, which claims priority to Swedish Patent Application No. 1751355-7, filed Oct. 31, 2017. The disclosures of each of the above applications are incorporated herein by reference in their entirety.

TECHNICAL FIELD

The present disclosure relates to a method of controlling an electronic device, the electronic device comprising a fingerprint sensor. The present disclosure also relates to a corresponding electronic device and to a computer program product.

BACKGROUND

Various types of biometric systems are used more and more in order to provide for increased security for accessing an electronic device, thereby providing an enhanced user convenience. In particular fingerprint sensors have been successfully integrated in such devices, for example, thanks to their small form factor, high performance and user acceptance. Among the various available fingerprint sensing principles (such as capacitive, optical, thermal, ultrasonic, etc.), capacitive sensing is currently most commonly used, in particular in applications where size and power consumption are important issues. The most common fingerprint sensors currently used have a size e.g. corresponding to fingertip (or smaller).

However, recently there has been a trend towards larger area fingerprint sensors. In relation to e.g. a mobile phone provided with a touch screen covering a majority of the front side of the mobile phone, such a large area fingerprint sensor may possibly be arranged such that it may be possible to capture a fingerprint image (of a finger of a user) essentially anywhere throughout a total surface area provided by the touch screen.

An example of such a system is disclosed in US20170053151A1, where an acoustic imaging sensor comprising a plurality of transducers is used for capturing a fingerprint image of a finger of a user touching the front of the mobile phone. The captured fingerprint image may be used either for detecting where at the front of the mobile phone the finger has placed his finger, or for authentication purposes, such as for authenticating an operation to be performed by the mobile phone.

The fingerprint sensing system according to US20170053151A1 provides for an excellent showcase of implementing fingerprint sensing throughout essentially the full front surface of the mobile phone. However, allowing uncontrolled capturing of fingerprint image data anywhere throughout the front surface of the mobile phone as is made possible using the implemented suggested in US20170053151A1 is not necessarily always positive, for example possibly having a negative impact on the responsiveness when using the fingerprint sensor. Thus, there appears to be room for further improvement, specifically in relation to how to control capturing of fingerprint image data in implementations where a large area fingerprint sensor is used.

SUMMARY

In view of above-mentioned and other drawbacks of the prior art, it is an object of the present disclosure to provide an improved method for determining and controlling where at a e.g. large area surface of a fingerprint sensor fingerprint image data may be allowed to be captured.

According to an aspect of the present disclosure, it is therefore provided a method of controlling an electronic device, the electronic device comprising a control unit, a display unit defining a first functional area, and a fingerprint sensor defining a second functional area, wherein the second functional area at least partly overlaps with the first functional area, wherein the method comprising the steps of detecting a user's finger within a portion of the second functional area of the fingerprint sensor, the portion defining a sensing area for the fingerprint sensor, the sensing area arranged at a first position within the second functional area of the fingerprint sensor, acquiring, at the sensing area using the fingerprint sensor, a fingerprint image of a finger of the user, authenticating, using the control unit, the user based on the acquired fingerprint image, receiving, at the control unit, a request to redefine the position of the sensing area, and determining, using the control unit, a second position for the sensing area only if the user has been successfully authenticated.

The present disclosure is based upon the realization that it possibly may be desirable to limit where, within a functional area of the fingerprint sensor, a fingerprint should be allowed to be acquired, such as at a selected portion (sensing area) of the functional area of the fingerprint sensor. In addition, it is desirable that a user of the electronic device may control a specific location of this selected portion of the functional area of the fingerprint sensor. However, the inventors have identified it may not be suitable to allow e.g. a relocation of the specific location to anyone. Rather, only an authenticated user should be allowed to perform such an action.

Accordingly and in line with the present disclosure, the user is first authenticated based on a fingerprint image acquired at a first position associated with the selected portion of the fingerprint sensor defining a sensing area. Then, only if the user is authenticated, the user is allowed to provide information defining a second position for the sensing area. The second position is then typically used for subsequent user operation involving the fingerprint sensor.

Advantages following the present disclosure involves e.g. for individualized operation of the electronic device comprising the fingerprint sensor based on the repositioning functionality as discussed above. In addition, since only an authenticated user is allowed to decide on where to position the sensing area, it may also be possible to allow for "hidden" authentication, possibly allowing the location for successfully acquiring a fingerprint image to be unknown for anyone else but the "true" owner of the electronic device.

Within the context of the present disclosure, the expression "fingerprint image" should be interpreted broadly and to include both a regular "visual image" of a fingerprint of a finger as well as a set of measurements relating to the finger when acquired using the fingerprint sensor. A plurality of fingerprint images may be subsequently acquired and fused together during a single session, where the resulting information is used as an input for determining fingerprint related features for used e.g. in relation to the authentication of the user's finger.

In a possible embodiment of the present disclosure the request to redefine the position of the sensing area comprises at least one of determining if a duration for detection of the finger within sensing area exceeds a first threshold, and determining if a pressure applied by the users finger within the sensing area exceeds a second threshold. That is, the repositioning may for example be initiated by the user holding his finger for a "long" time (first threshold) at the first location or by applying an increased amount of pressure (second threshold) with his finger in a direction towards the fingerprint sensor. It should however be understood that other means may be applied for initiating the repositioning, such as for example by voice command or by allowing the user to enter into a settings menu presented at a graphical user interface (GUI) provided at the display unit, or by pressing a predefined button at the electronic device, etc. The GUI may also be used for providing an instruction to the user for repositioning of the finger for determining the second position for the sensing area.

Furthermore, the determination of the second position for the sensing area may for example comprise determining a position of the user's finger within the second functional area. Accordingly, the total functional area of the fingerprint sensor may possibly be used for determining the second location. That is, the total functional area of the fingerprint sensor may be used for identifying the location of the users finger for determining the second position, such as for example by acquiring, using the fingerprint sensor, one or a plurality of fingerprint images at the second functional area at least partly outside of the sensing area.

As an alternative (or also), the display unit may be implemented as a touch display screen and determination of the position of the user's finger may comprises determining a position of the user's finger within the first functional area of the touch display screen, and correlating a coordinate system for the first functional area with a coordinate system for the second functional area for determining the position of the user's finger within the second functional area. Accordingly, an indication of the second location is determined using the touch screen and then "mapped" to the coordinate system of the fingerprint sensor.

In an embodiment of the present disclosure, the first position is different from the second position. It may be possible to only allow the second position to be set if the second position differs from the first position with more than a distance threshold. Possibly, such a distance threshold may correspond to at least 5% of a width or height of the functional area of the fingerprint sensor.

As defined above the first functional area of the display unit at least partly overlaps with the second functional area pf the fingerprint sensor. In a preferred embodiment of the present disclosure the second functional area constitutes at least 70% of the first functional area, preferably at least 80% and most preferably 90%. Accordingly, in such an embodiment the functional are of the fingerprint sensor will be defined to be within "a boundary" of the display unit, where the display unit overlaps with the fingerprint sensor. As would be apparent, there may thus be desirable (in line with the discussion above) to have information available for allowing a correlation between a coordinate system for the display unit and the overlap between the display unit and the fingerprint sensor to be readily available when the display unit (and touch screen) is used for determining the second position.

The fingerprint sensor may, as indicated above, be implemented using any kind of currently or future fingerprint sensing principles, including for example capacitive, optical, thermal or ultrasonic sensing technology.

In a preferred embodiment of the present disclosure, the fingerprint sensor is implemented using said ultrasonic technology. In a possible embodiment, the fingerprint sensor may comprise a plurality of ultrasonic transducers in the vicinity of a circumference of the second functional area, and the method further comprises the step of operating a selected portion of the plurality of ultrasonic transducers for acquiring the fingerprint image. Preferably, the portion of the plurality of ultrasonic transducers may be selected based on the first or the second position of the sensing area. Accordingly, rather than activating all of the transducers only a selected few or set of transducers are used, thus allowing for an optimization of an energy consumption of the fingerprint sensor, possibly allowing for an increase operational lifetime of the electronic device in case the electronic device is battery powered.

It may, in line with the present disclosure, be possible to further allow for a size of the user's finger to be identified (i.e. the area of the finger comprising the users fingerprint), and defining a size of the sensing area based on the size of identified size of the user's finger. Such an embodiment may possibly further increase the security of the electronic device as only a sensing area corresponding to that specific user may be allowed to be used for acquiring fingerprint images. In addition, this may also allow for a further optimization of the number of ultrasonic transducers that are to be selected/activated for capturing fingerprint images.

According to the present disclosure, the control unit is preferably an ASIC, a microprocessor or any other type of computing device for controlling the operation of the fingerprint sensor. However, the control unit may also be a general control unit comprised with the electronic device, for example configured for controlling the overall operation of the electronic device.

According to another aspect of the present disclosure, there is provided an electronic device, comprising a control unit, a display unit defining a first functional area and a fingerprint sensor defining a second functional area, wherein the second functional area at least partly overlaps with the first functional area, wherein the electronic device is adapted to detect a user's finger within a portion of the second functional area of the fingerprint sensor, the portion defining a sensing area for the fingerprint sensor, the sensing area arranged at a first position within the second functional area of the fingerprint sensor, acquire, at the sensing area using the fingerprint sensor, a fingerprint image of a finger of the user, authenticate, using the control unit, the user based on the acquired fingerprint image, receive, at the control unit, a request to redefine the position of the sensing area, and determine, using the control unit, a second position for the sensing area only if the user has been successfully authenticated. This aspect of the present disclosure provides similar advantages as discussed above in relation to the previous aspect of the present disclosure.

In a possible embodiment of the present disclosure the electronic device is mobile and implemented as a mobile phone, a tablet or a laptop.

According to a further aspect of the present disclosure, there is provided a computer program product comprising a non-transitory computer readable medium having stored thereon computer program means for a control unit adapted for controlling an electronic device, the electronic device further comprising a display unit defining a first functional area, and a fingerprint sensor defining a second functional area, wherein the second functional area at least partly overlaps with the first functional area, wherein the computer program product comprises code for detecting a user's finger within a portion of the second functional area of the fingerprint sensor, the portion defining a sensing area for the fingerprint sensor, the sensing area arranged at a first position within the second functional area of the fingerprint sensor, code for detecting acquiring, at the sensing area using the fingerprint sensor, a fingerprint image of a finger of the user, code for detecting authenticating, using the control unit, the user based on the acquired fingerprint image, code for detecting receiving, at the control unit, a request to redefine the position of the sensing area, and code for detecting determining, using the control unit, a second position for the sensing area only if the user has been successfully authenticated. Also, this aspect of the present disclosure provides similar advantages as discussed above in relation to the previous aspects of the present disclosure.

As mentioned above, the control unit is preferably an ASIC, a microprocessor or any other type of computing device. Similarly, a software executed by the control unit for operating the inventive system may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled person. Like reference characters refer to like elements throughout.

Figure 1A:
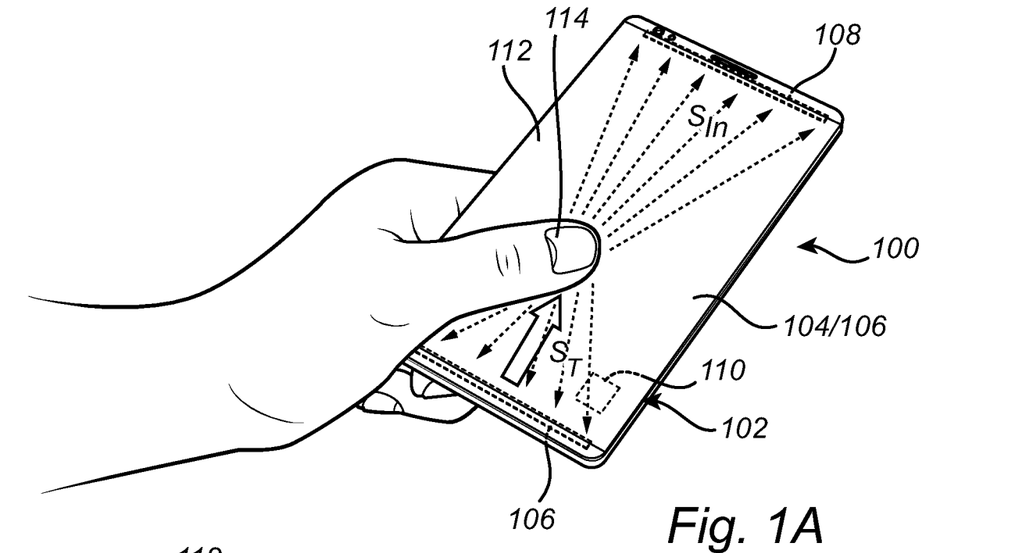
FIG. 1A is an illustration of an exemplary electronic device comprising a fingerprint sensor according to an embodiment of the present disclosure, the electronic device presented in the form of a mobile phone.

Turning now to the drawings and to FIG. 1A in particular, there is schematically illustrated an example embodiment of the electronic device according to the present disclosure, in the form of a mobile phone 100 with an integrated fingerprint sensor 102 and a display unit 104 comprising a touch screen 106. In this embodiment, the fingerprint sensor 102 and the display unit 104/touch screen 106 are together arranged at the front side of the mobile phone 100. The fingerprint sensor 102 may, for example, be used for unlocking the mobile phone 100 and/or for authorizing transactions carried out using the mobile phone, etc.

In the example presented in FIG. 1A, the fingerprint sensor is implemented to apply ultrasonic technology to acquire a fingerprint image of a finger of a user. The fingerprint sensor 100 may in accordance to the present disclosure be implemented using an ultrasonic transducer device including a first piezoelectric element and a second piezoelectric element, each having first and second transducer electrodes that are both connectable from one side of the ultrasonic transducer device. The mobile phone 100 further comprises a control unit 100 adapted for processing fingerprint image data acquired using the fingerprint sensor 102.

It should be understood that the concept as is provided in line with the present disclosure also or instead may be used in relation to fingerprint sensors employing different technologies, such as e.g. capacitive, optical, etc. as has been mentioned above. Generally, the concept according to the present disclosure is increasingly advantageous when used in relation to so called large area fingerprint sensors, having a functional (or active) area covering a major portion of e.g. an area of the touch screen 106. However, the concept according to the present disclosure may also be useful in relation to smaller fingerprint sensors, such as having a functional area only covering a minor portion of the touch screen 106.

As is schematically indicated in FIG. 1A, the fingerprint sensor 102 comprises a first ultrasonic transducer array 106, a second ultrasonic transducer array 108, where the control unit 110 is connected to the first 106 and second 108 ultrasonic transducer arrays.

The first ultrasonic transducer array 106 and the second ultrasonic transducer array 108 are both acoustically coupled to a device member, here cover glass 112, of the electronic device 100 to be touched by the user. The user touch is indicated by the thumb 114 in FIG. 1A.

When the fingerprint sensor 102 is in operation, the control unit 110 controls one or several piezoelectric element(s) comprised in at least one of the first 106 and the second 108 ultrasonic transducer arrays to transmit an acoustic transmit signal $S_T$, indicated by the block arrow in FIG. 1A. Further, the controller 110 controls at least one of the first 106 and the second 108 ultrasonic transducer arrays to receive acoustic interaction signals $S_{In}$, indicated by the dashed arrows in FIG. 1A. The acoustic interaction signals $S_{In}$ are indicative of interactions between the transmit signal $S_T$ and the interface between the cover glass 112 and the skin of the user (thumb 114). The acoustic interaction signals $S_{In}$ are transformed to electrical signals by the receiving piezoelectric elements in the first 106 and/or second 108 ultrasonic transducer arrays, and the electrical signals are processed by the controller 110 to provide a representation of the fingerprint of the user.

The acoustic interaction signals $S_{In}$ are presently believed to mainly be due to so-called contact scattering at the contact area between the cover glass and the skin of the user (thumb 114).

The acoustic transmit signal $S_T$ may advantageously be a pulse train of short pulses (impulses), and the acoustic interaction signals $S_{In}$, which may be measured for different angles by different receiving piezoelectric elements, are impulse responses. The impulse response data carried by the acoustic interaction signals $S_{In}$ can be used to reconstruct a representation of the contact area (the fingerprint) using a reconstruction procedure similar to methods used in ultrasound reflection tomography.

It should be understood that the "representation" of the fingerprint of the user may be any information extracted based on the received acoustic interaction signals $S_{In}$, which is useful for assessing the similarity between fingerprint representations acquired at different times. For instance, the representation may comprise descriptions of fingerprint features (such as so-called minutiae) and information about the positional relationship between the fingerprint features. Alternatively, the representation may be a fingerprint image, or a compressed version of the fingerprint image. For example, the image may be binarized and/or skeletonized. Moreover, the fingerprint representation may be the above-mentioned impulse response representation.

Preferably and as is apparent for the skilled person, the mobile phone 100 shown in FIG. 1A further comprises a first antenna for WLAN/Wi-Fi communication, a second antenna for telecommunication communication, a microphone, a speaker, and a phone control unit. Further hardware elements are of course possibly comprised with the mobile phone. It should furthermore be noted that the present disclosure may be applicable in relation to any other type of electronic device, such as a laptop, a remote control, a tablet, computer, IoT/Machine type communication device, or any other type of present or future similarly configured device.

Figure 1B:
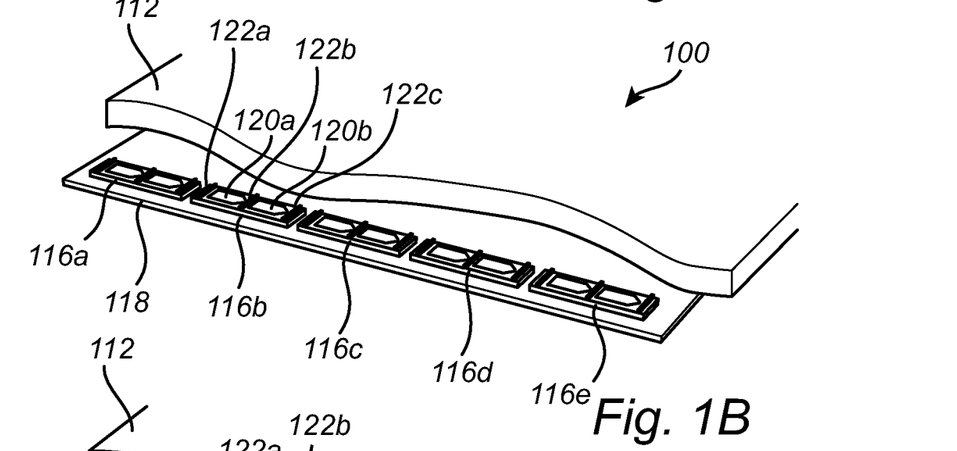
FIG. 1B is a schematic illustration of an embodiment of a first ultrasonic transducer device configuration provided as a component of the fingerprint sensor comprised with the electronic device in FIG. 1A.

FIG. 1B is a schematic illustration of a first ultrasonic transducer device configuration in the electronic device 100 in FIG. 1A, in which a plurality of ultrasonic transducer devices 116a-e are electrically and mechanically connected to a connector, here exemplified by a transducer substrate 118, and acoustically coupled to the device member (cover glass 112). In the example configuration shown in FIG. 1B, each ultrasonic transducer device 116a-e comprises a first 120a and a second 120b piezoelectric element (only indicated for one of the ultrasonic transducer devices in FIG. 1B to avoid cluttering the drawing). As is also schematically indicated in FIG. 1B, each ultrasonic transducer device 116a-e comprises spacer structures 122a-c, that are configured to define a distance between the piezoelectric elements 120a-b and the attachment surface of the cover glass 112. The spacer structures 122a-c, which may advantageously be dielectric spacer structures, are configured to allow any excess (conductive or non-conductive) adhesive or solder to escape from the area directly above the piezoelectric elements 120a-b when the ultrasonic transducer device 122a-e is pressed against the cover glass 112.

Figure 1C:
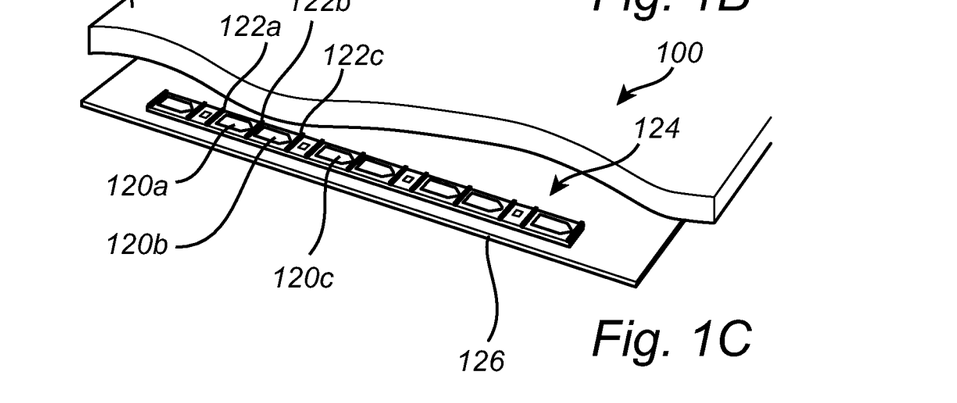
FIG. 1C is a schematic illustration of a second ultrasonic transducer device configuration provided as a component of the fingerprint sensor comprised with the electronic device in FIG. 1A.

FIG. 1C is a schematic illustration of a second ultrasonic transducer device configuration in the electronic device 1 in FIG. 1A, in which an ultrasonic transducer array component 124 is electrically and mechanically connected to a connector, here exemplified by a transducer substrate 126, and acoustically coupled to the device member (cover glass 112). In the example configuration shown in FIG. 1C, the ultrasonic transducer array component 124 comprises eight piezoelectric elements 120a-c (only three of these are indicated by reference numerals in FIG. 1C to avoid cluttering the drawing). As is also schematically shown in FIG. 1C, the ultrasonic transducer array component 124 in FIG. 1C further comprises four integrated circuits 126 (again, only one of these is indicated in FIG. 1C), for interfacing with the piezoelectric elements 120a-c. The integrated circuits 126, may, for example be ultrasound driver circuits for driving at least one piezoelectric element with a relatively high voltage signal, such as 12 V or more, and/or ultrasound receiver circuits. The integrated circuit 126 indicated in FIG. 1C is connected to the piezoelectric elements 120b and 120c.

To be able to achieve high quality fingerprint representations, it is expected to be beneficial to use relatively high acoustic frequencies, and to provide for a good acoustic coupling between the piezoelectric elements comprised in the ultrasonic transducer devices and the device member to be touched by the user (such as the cover glass 120). By "good acoustic coupling" should be understood a mechanical coupling with a small damping and/or distortion of the acoustic signal at the interface between the piezoelectric element(s) and the device member to be touched by the user.

To provide for high acoustic frequencies, it is expected that the piezoelectric elements should be very thin, such as around 100 µm or less.

To provide for the desired good acoustic coupling, it may be desirable to arrange such that the facing the device member to be touched by the finger is formed to be as thin and smooth (low surface roughness) as possible. It is also expected that the mechanical joint between the piezoelectric element(s) and the device member to be touched by the finger should be as thin and stiff as possible, at least for the relevant acoustic frequencies, especially for chemically strengthened glass, such as so-called gorilla glass. At the same time, it is typically desirable that the ultrasonic transducer devices are adapted for cost-efficient mass-production.

Figure 2A:
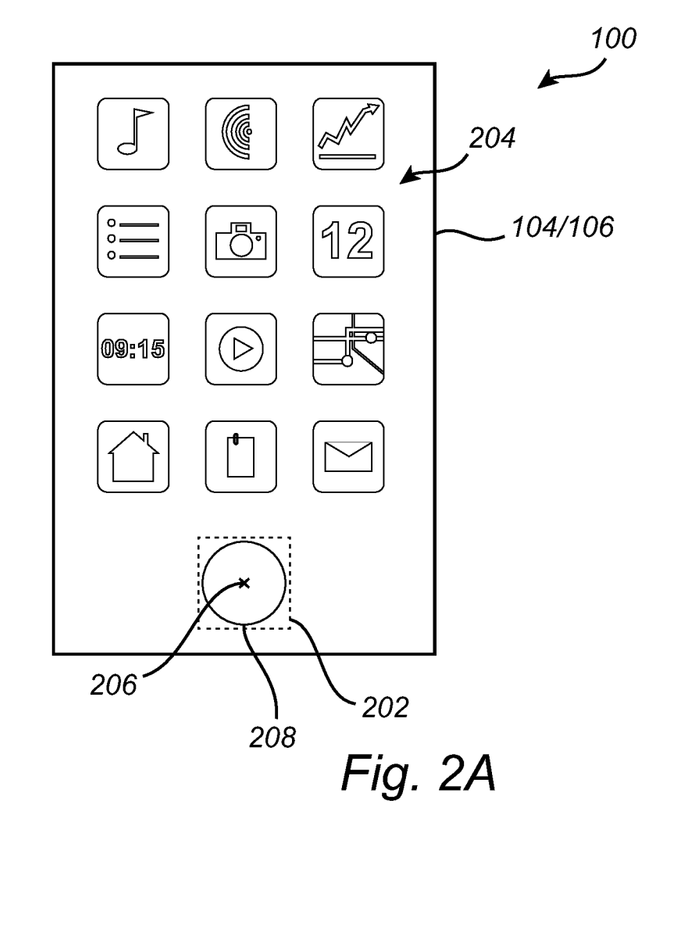
FIGS. 2A-2C illustrates possible steps taken by a user in operating a graphical user interface (GUI) adapted for redefining a sensing area of e.g. the fingerprint sensor as illustrated in FIG. 1A.
Figure 2B:
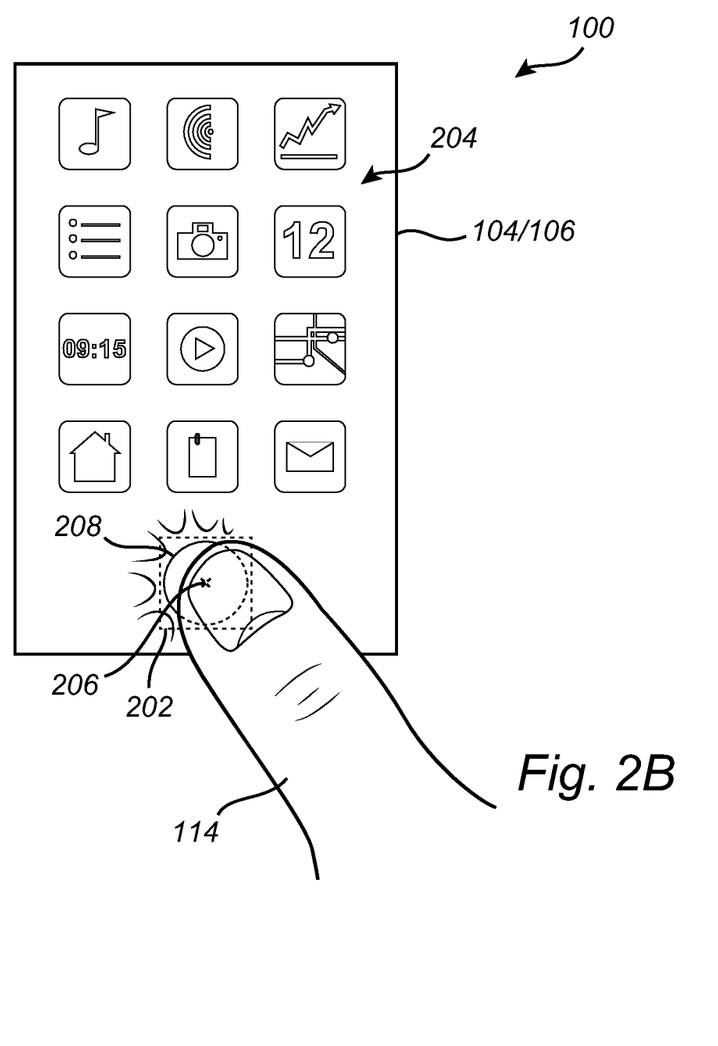
Figure 2C:
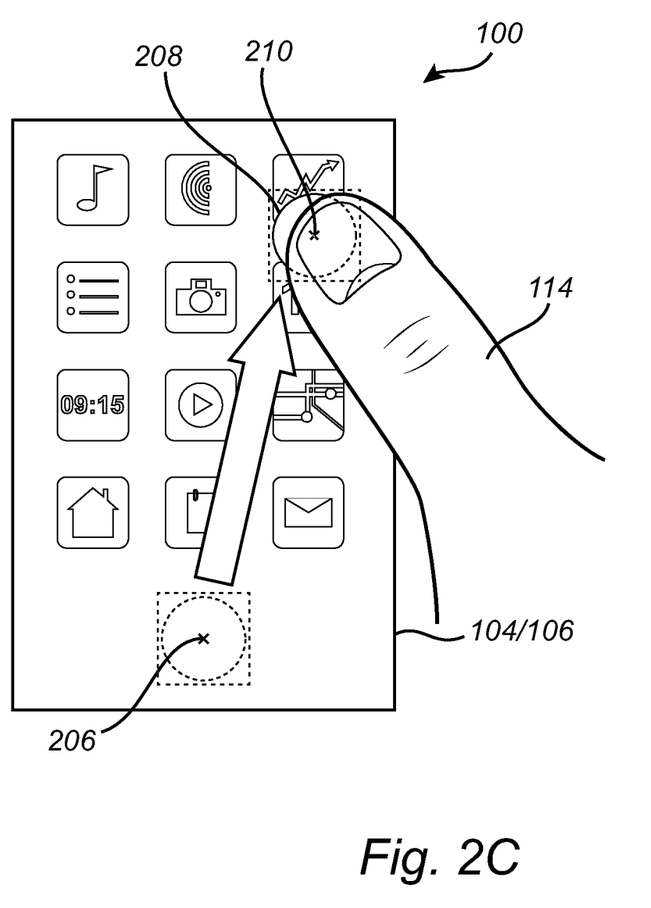
Figure 3:
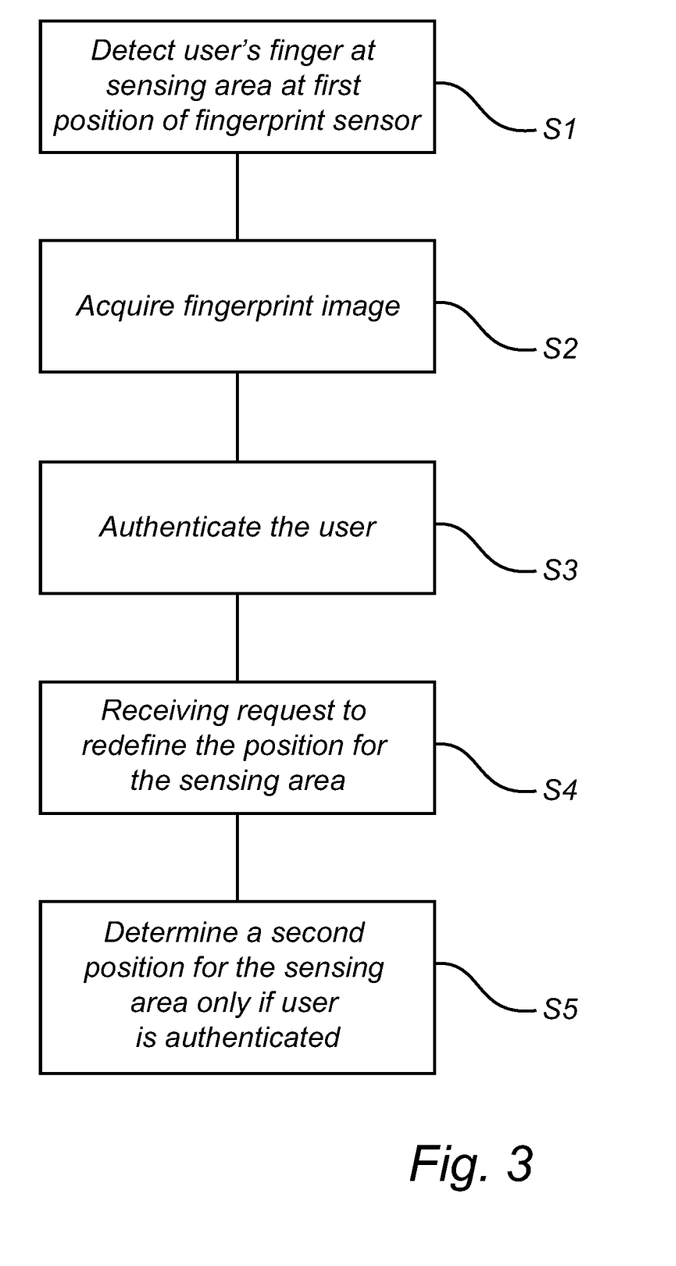
FIG. 3 is a flowchart illustrating the operation of the electronic device according to an embodiment of the present disclosure.

With further reference to FIGS. 2A-2C and to FIG. 3, the fingerprint sensor 102 as comprised with the mobile phone 100 is, as understood from the above discussion, arranged to allow the user to position his thumb 114 or any other finger essentially anywhere throughout the area corresponding to the touch screen 106 for allowing fingerprint authentication. However, in some situations it may be suitable to allow only a selected portion of the functional area of the fingerprint sensor 102, below defined as a rectangular sensing area 202, to be allowed for e.g. user authentication. This sensing area 202 may of course be different (form, shape, size) depending on e.g. which one of a plurality of software applications ("Apps") that is active at the mobile phone 100. The different Apps may typically comprise a graphical user interface (GUI) 204 presented at the display unit 106.

In the example presented in FIGS. 2A-2C, the specific App being active at the mobile phone 100 is implemented to make use of at least some portions of the concept as defined in accordance to the present disclosure. As explicitly illustrated, the GUI 204 being part of the specific App will from time to time request the user to be authenticated using the fingerprint sensor 102 comprised with the mobile phone 100.

In FIG. 2A, the GUI 204 requests the user to position his finger at a first position 206 within the functional area of the fingerprint sensor 102. In the exemplary embodiment as shown in FIG. 2A, the first position 206 is shown as a circle 208 within the GUI 204. In FIG. 2A the sensing area 202 is illustrated as having an area being slightly larger as compared to an area of the circle 208; however this is only provided for illustrative purposes. The first position 206 is in turned illustrated as a center point within the sensing area 202/circle 208. The GUI 204 is additionally configured to provide the user with a request that the user is to position his e.g. thumb 114 or any other finger at the circle 208.

Once the user has proceeded as requested, the user's finger 114 is detected, S1, at the sensing area 202 defined at and around the first position 206. In the illustrated embodiment as shown in FIG. 2A, the first position 206 is shown to be in the bottom center of the touch screen 106. In accordance to the shown example, the first position 206 is predefined by the App, however other means for defining the first position 206 is of course possible and within the scope of the present disclosure. Furthermore, it should be understood that the detection of the user's finger 114 may be performed using e.g. either or both of the fingerprint sensor 102 and the touch screen 106.

Following the detection of the user's finger, a fingerprint image of the user's finger 114 will be acquired, S2, using the fingerprint sensor 102. The fingerprint sensor 102 may in one embodiment be adapted to only acquire data from within the sensing area 202. By such means, the process of acquiring fingerprint image data may be possibly be performed faster as compared to when all of the functional area of the fingerprint sensor 102 is "active" for acquiring fingerprint image data. With reference again to FIGS. 1B and 1C, this would mean that only a selected portion of the piezoelectric elements 120 need to be activated, possibly also reducing power consumption for acquiring the fingerprint image of the user's finger 114.

As discussed above, the fingerprint image is to be used for extracting a plurality of fingerprint features relating to the fingerprint of the user's finger 114. These fingerprint features may in turn be used for authenticating, S3, the user based on acquired fingerprint image. The authentication is typically performed by matching the fingerprint features acquired from the fingerprint image to corresponding fingerprint features comprised with a fingerprint template stored with the e.g. the mobile phone 102, a process that is well known to the skilled person.

In the illustrated embodiment as shown in FIG. 2B, the App is configured to allow the user to redefine the position of the sensing area 202. That is, the user may in some instances be given the option to position the sensing area 202 differently, for example for simplifying future authentication due to how the user normally holds the mobile phone 100 during normal use. Other reasons may relate to the above discussed "hidden" authentication, where only the user knows the "correct" position for e.g. placing his finger for allowing the mobile phone 100 to be unlocked or for a transaction to be approved.

In FIG. 2B this possibility for redefinition of the position for the sensing area 202 is illustrated in the GUI 204 by the circle 208 starting to "flash". The circle 208 will however not start to flash until e.g. the user holds his finger firmly at the first position 206 for a predetermined time period, such as at least 2 seconds (may of course be more or less or achieved by other means such as e.g. a "hard push" as mentioned above), thus defining a request, S4, for repositioning the sensing area 202. Other possibilities are of course possible and in line with the concept according to the present disclosure. The user may then, if the user has been successfully authenticated as discussed above, be allowed to reposition the sensing area 202 to a new position, in the following defined as a second position 210 for the sensing area 202.

The redefinition of the position of the sensing area 202 may for example take place by the user "dragging" the circle 208 to the second position 210, as is seen in FIG. 2C. The user may e.g. then "release" the circle 208 at the new position, whereby a determination, S5, is made of the second position 210. The determination of the second position may be performed by involving either or both of the fingerprint sensor 102 and the touch screen 106. The determination of the second position 210 may also include determining a size of the user's finger 114. This information could possibly be used in a future authentication of the user, i.e. by comparing a size of the finger in a future acquired fingerprint image with the mentioned previously determined size of the finger. In the exemplary illustration shown in FIG. 2B, the user has dragged the circle 208 in a direction towards a top right corner of the mobile phone 100.

The location of the second position 210 is preferably stored with e.g. a computing memory (not explicitly shown) of the mobile phone 100 for future use in e.g. authenticating the user, using the specific App or in general authentication of the user. Accordingly, the illustrated App may for example be seen as an App specifically adapted for redefinition of the sensing area 202. It is however of course possible to allow this functionality to be provided with any possible App adapted to be active at the mobile phone 100.

The control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed present disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method of controlling an electronic device, the electronic device comprising a control unit, a display unit defining a first functional area, and a fingerprint sensor defining a second functional area, wherein the second functional area at least partly overlaps with the first functional area, wherein the method comprises:
    detecting, using the fingerprint sensor and the control unit, a user's finger within a portion of the second functional area of the fingerprint sensor, the portion defining a sensing area for the fingerprint sensor, the sensing area arranged at a first position within the second functional area of the fingerprint sensor;
    acquiring, at the sensing area arranged at the first position and using the fingerprint sensor, a fingerprint image of a finger of the user;
    authenticating, using the control unit, the user based on the acquired fingerprint image;
    receiving, at the control unit, a request to redefine the position of the sensing area within the second functional area;
    determining, using the control unit, a second position for the sensing area only if the user has been successfully authenticated; and
    setting the second position for the sensing area,
    wherein, before the user is authenticated, the sensing area is not displayed on the display unit such that the set position of the sensing area is hidden, and
    wherein authentication of the user after setting the second position for the sensing area is based on an image of the fingerprint of the user acquired at the second position such that authentication is based on both the fingerprint of the user and the second position.

2. The method according to claim 1, further comprising: receiving an instruction for setting the first position for the sensing area.

3. The method according to claim 1, wherein receiving an instruction to redefine the position of the sensing area comprises at least one of:
    determining if a duration for detection of the finger within sensing area exceeds a first threshold; and
    determining if a pressure applied by the users finger within the sensing area exceeds a second threshold.

4. The method according to claim 1, wherein determining the second position for the sensing area comprises:
    determining, using the fingerprint sensor and the control unit, a position of the user's finger within the second functional area.

5. The method according to claim 4, wherein determining the position of the user's finger comprises:
    acquiring, using the fingerprint sensor, one or a plurality of fingerprint images at the second functional area at least partly outside of the sensing area.

6. The method according to claim 4, wherein the display unit is a touch display screen and determining the position of the user's finger comprises:
    determining, using the display unit and the control unit, a position of the user's finger within the first functional area of the touch display screen; and
    correlating a coordinate system for the first functional area with a coordinate system for the second functional area for determining the position of the user's finger within the second functional area.

7. The method according to claim 4, further comprising:
    identifying, using the control unit a size of the user's finger; and
    defining a size of the sensing area based on the size of identified size of the user's finger.

8. The method according to claim 1, wherein the first position is different from the second position.

9. The method according to claim 1, wherein the second position is set only if the second position differs from the first position with more than a distance threshold.

10. The method according to claim 1, wherein the second functional area constitutes at least 70% of the first functional area.

11. The method according to claim 1, wherein the fingerprint sensor comprises a plurality of ultrasonic transducers in the vicinity of a circumference of the second functional area, and the method further comprises:
    operating a selected portion of the plurality of ultrasonic transducers for acquiring the fingerprint image.

12. The method according to claim 11, wherein the portion of the plurality of ultrasonic transducers are selected based on the first or the second position of the sensing area.

13. The method according to claim 1, wherein the display unit is adapted to display a graphical user interface (GUI), wherein the method comprises:
    providing, using the GUI, an instruction to the user for repositioning of the finger for determining the second position for the sensing area.

14. An electronic device, comprising:
    a control unit;
    a display unit defining a first functional area; and
    a fingerprint sensor defining a second functional area, wherein the second functional area at least partly overlaps with the first functional area,
    wherein the electronic device is adapted to:
        detect, using the fingerprint sensor and the control unit, a user's finger within a portion of the second functional area of the fingerprint sensor, the portion defining a sensing area for the fingerprint sensor, the sensing area arranged at a first position within the second functional area of the fingerprint sensor;
        acquire, at the sensing area arranged at the first position and using the fingerprint sensor, a fingerprint image of a finger of the user;
        authenticate, using the control unit, the user based on the acquired fingerprint image;
        receive, at the control unit, a request to redefine the position of the sensing area within the second functional area;
        determine, using the control unit, a second position for the sensing area only if the user has been successfully authenticated; and
        set the second position for the sensing area,
        wherein, before the user is authenticated, the sensing area is not displayed on the display unit such that the set position of the sensing area is hidden, and
        wherein authentication of the user after setting the second position for the sensing area is based on an image of the fingerprint of the user acquired at the second position such that authentication is based on both the fingerprint of the user and the second position.

15. The electronic device according to claim 14, wherein the display unit is a touch display screen and determine the position of the user's finger comprises:
   determining, using the display unit and the control unit, a position of the user's finger within the first functional area of the touch display screen; and
   correlating a coordinate system for the first functional area with a coordinate system for the second functional area for determining the position of the user's finger within the second functional area.

16. The electronic device according to claim 14, wherein the fingerprint sensor is adapted to employ one of ultrasonic or capacitive sensing technology.

17. The electronic device according to claim 14, wherein the fingerprint sensor comprises a plurality of ultrasonic transducers in the vicinity of a circumference of the second functional area, and the electronic device is adapted to:
   operate a selected portion of the plurality of ultrasonic transducers for acquiring the fingerprint image.

18. The electronic device according to claim 14, wherein the electronic device is at least one of a tablet and a mobile phone.

19. A computer program product comprising a non-transitory computer readable medium having stored thereon computer program means for a control unit adapted for controlling an electronic device, the electronic device further comprising a display unit defining a first functional area, and a fingerprint sensor defining a second functional area, wherein the second functional area at least partly overlaps with the first functional area,
wherein the computer program product comprises:
   code for detecting, using the fingerprint sensor and the control unit, for a user's finger within a portion of the second functional area of the fingerprint sensor, the portion defining a sensing area for the fingerprint sensor, the sensing area arranged at a first position within the second functional area of the fingerprint sensor;
   code for acquiring, at the sensing area arranged at the first position and using the fingerprint sensor, a fingerprint image of a finger of the user;
   code for authenticating, using the control unit, the user based on the acquired fingerprint image;
   code for receiving, at the control unit, a request to redefine the position of the sensing area within the second functional area;
   code for determining, using the control unit, a second position for the sensing area only if the user has been successfully authenticated; and
   code for setting the second position for the sensing area,
wherein, before the user is authenticated, the sensing area is not displayed on the display unit such that the set position of the sensing area is hidden, and
wherein authentication of the user after setting the second position for the sensing area is based on an image of the fingerprint of the user acquired at the second position such that authentication is based on both the fingerprint of the user and the second position.

* * * * *